May 25, 1943.  E. KUPKA  2,320,082
CHAIN SAW
Filed Dec. 3, 1940  2 Sheets-Sheet 1
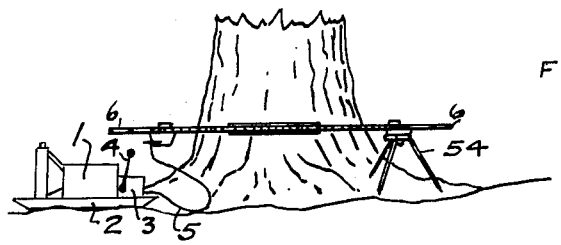
Fig. 1.
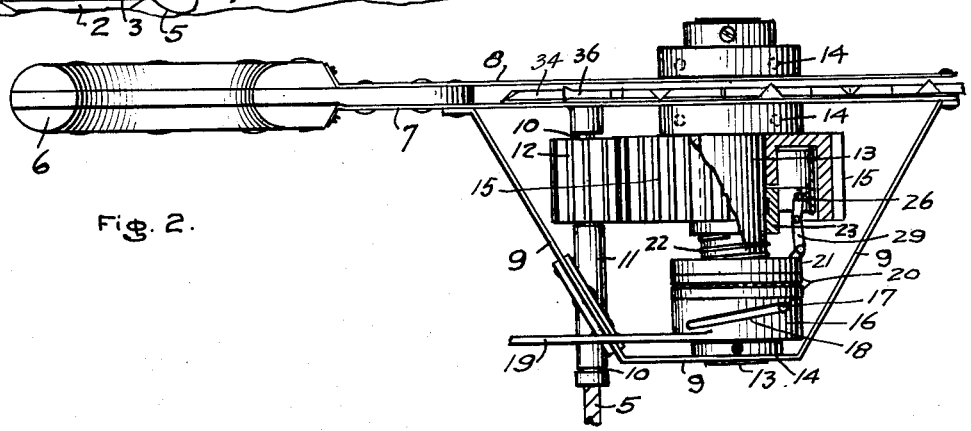
Fig. 2.
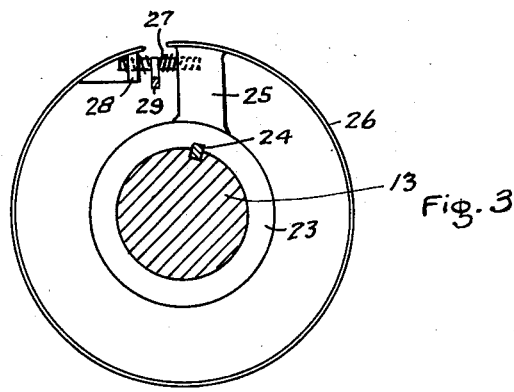
Fig. 3.
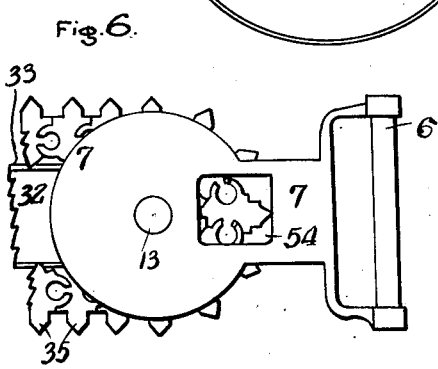
Fig. 6.
Inventor
Edward Kupka
By 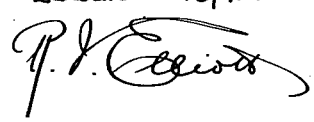
Attorney Patented May 25, 1943

2,320,082

UNITED STATES PATENT OFFICE 2,320,082

CHAIN SAW

Edward Kupka, Buckley, Wash.

Application December 3, 1940, Serial No. 368,279

1 Claim. (Cl. 143—32)

This invention relates to chain saws adapted for use in cutting logs, trees, stumps, etc., and driven by power means.

The objects of the invention are to provide a power-driven saw which will be light and easy to transport over rough terrain; which is flexibly connected to the power source; which is provided with independent clutch means between the power source and the saw; in which each link in the chain is provided with cutting or raking means; in which any link may be quickly removed and replaced by a similar link; and which is simple to set up and to operate.

I attain these and other objects by the devices, mechanisms, and arrangements illustrated in the accompanying drawings, in which—

Figure 4:
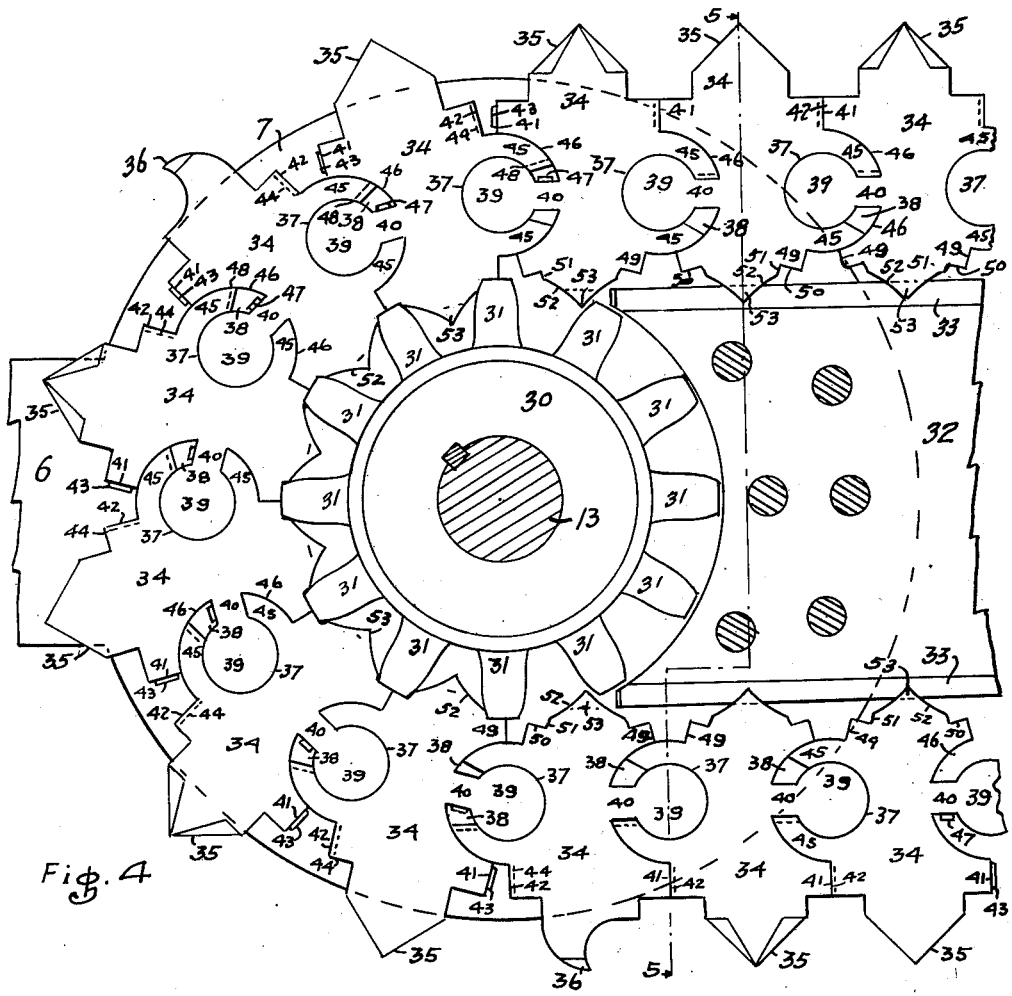
Figure 5:
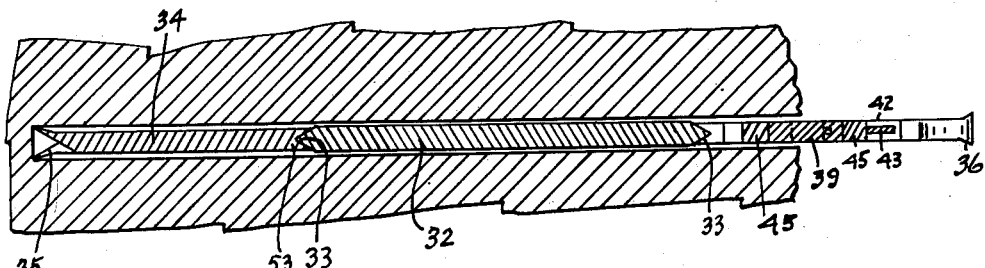

Fig. 1 is an illustration of my invention in the act of sawing a stump; Fig. 2 is a side elevation showing the handle end of the saw and illustrating particularly the driving gear and clutch-operating control, parts thereof being shown in section to reveal the construction; Fig. 3 is an elevation of the clutch band; Fig. 4 is a plan view of the driving gear of the saw and of the chain saw in contact therewith; Fig. 5 is a section of the saw taken on the line 5—5 in Fig. 4 and showing the saw as in the kerf cut thereby in a log; and Fig. 6 is an elevation of the end of my improved saw, showing especially the hole for permitting the removal of individual teeth.

Similar numerals of reference refer to similar parts throughout the several views.

Referring to Fig. 1 of the drawings, it will be seen that the engine 1 is mounted on a suitable sledge 2 which may be dragged to the desired position adjacent to the work to be performed, and that the transmission gear in the box 3, controlled by the hand lever 4, delivers its controlled rotation to the flexible transmission shaft 5. All of the above apparatus is illustrated only in general outline as any well known apparatus of the type may be used. The shaft 5 leads to the chain saw actuating mechanism, illustrated in Fig. 2.

This actuating mechanism includes an end frame comprising a handle 6, secured to two flat plates 7 and 8, between which the chain saw is mounted, and a depending plate 9, secured to the under side of the lower plate 7. The flexible shaft 5 is attached by any suitable means to the pinion shaft 10, which is mounted in suitable bearings 11 secured to the plate 9 of the frame. A pinion 12 is secured to the shaft 10. A jack shaft 13 is mounted parallel to the shaft 10 and passes through the plates 7, 8 and 9, being mounted in suitable ball bearings 14 secured to the said several plates. A drive gear 15 is loosely mounted on the said shaft 13 and meshes with the pinion 12.

The lower bearing 14 of the shaft 13 is secured to the frame plate 9 and extends upward inside of a cylindrical control boss 16, which is adapted to turn thereon. A pin 17 is secured in the body of said lower bearing 14 and extends outward therefrom through a slot 18 in the boss 16. This slot in the boss 16 is inclined axially. An operating handle 19 extends laterally from the boss 16 and is adapted to turn the said boss 16 on the said lower bearing 14, thus moving the boss 16 laterally along the axis of the shaft 13. A thrust bearing 20 is mounted on the shaft 13, above the said boss 16, and a disk 21 is mounted concentric with and in contact with the said thrust ball bearing 20, said disk 21 turning with the shaft 13 and being free to move axially thereon under the thrust of the boss 16 as it is turned on the bearing 14 by the handle 19. A spring 22 opposes the upward motion of the disk 21 on the shaft 13.

A friction clutch, which comprises a boss 23 (Fig. 3) secured to the shaft 13 by means of a key 24, with a substantial arm 25 extending therefrom and secured to one end of a friction expansion band 26, is mounted to engage the prepared inner surface of the gear 15. This expansion band 26 may be expanded by turning a right-left screw-threaded bolt 27 which engages in the arm 25 at one end of the band 26, and a lug 28 secured to the other end of the band 26 (Fig. 3).

This bolt 27 is connected by the links 29 to the disk 21 in such manner that the axial motion of the disk 21, upward along the shaft 13, turns the screw 27 to expand the said friction band 26. This band 26, when expanded operatively engages the prepared inner surface of the gear 15 so that the shaft 13 will be rotated with the gear 15 by the pinion 12.

As above stated, the shaft 13 extends through the plates 7 and 8. A chain-saw driving gear wheel 30 is mounted on and keyed to the shaft 13, between the plates 7 and 8, and turns therewith. This gear wheel 30 may have the usual gear teeth 31 or the teeth thereof may be specially designated.

A separator plate 32 extends from one end of the saw to the other, being secured to the two end handle frames at its ends, and lies in the plane of the chain saw teeth. The handle frame at the idler end of the saw may be similar to that above described at the driving end of the saw, but it is not provided with any actuating means. The upper and lower edges 33 of the plate 32 may be beveled as shown in Fig. 5. The width of the plate 32 is such as to carry the saw teeth on the said beveled edges 33 as they approach and leave the driving gear 30 and the corresponding idler gear at the other end of the plate 32.

The saw teeth 34 may either have cutting edges, as at 35, or rakers 36 to clean out the sawdust from the saw kerf. Each separate tooth comprises an individual link in the chain which loops around the driving wheel 30 and the corresponding idler, and no intermediate links are provided, thus giving the saw a greater number of cutting teeth for any length of saw than could be had if intermediate links were provided. Each link of the chain is provided with a swivel connection to its adjacent links, thus permitting the chain to bend around the driving and idler wheels.

A shown in Fig. 4 each tooth 34 is provided with a circular socket 37, having an opening 38 in its rear edge, and a complementary circular head 39, carried on the end of a neck 40 extending forward from the main body of the tooth, said head 39 fitting in the socket 37 of the preceding tooth 34. The spacing of the centers of the socket 37 and the head 39 is the spacing of the teeth of the saw and is such that it corresponds with the chord of the circle along which said heads and sockets move around the wheel 30 and subtending the radii of the teeth 31 thereof. This distance between the centers of the parts 37 and 39 comprises also the width of the main body of the tooth between the upper shoulders 41 and 42. The front shoulder 41 is provided with a narrow tooth or lug 43 and the rear shoulder 42 is provided with a complementary groove 44 into which the lug 43 fits when the tooth is traveling on the separator plate 32, but the said parts 43 and 44 are separated when the chain passes around the wheel 30.

The socket 37 is bounded by two curved arms 45, concentric with the said socket 37 and which fit in the complementary curved slots 46 concentric with the head 39 of the next following tooth 34. The space 38 between the ends of the arms 45 is wider than the neck 40 which lies therebetween, being thus formed to permit the head 39 to turn in the socket 37 as the tooth passes around the wheel 30.

The upper side of the neck 40 is provided with a narrow tooth or lug 47 which is adapted to fit in a complementary groove 48 in the end of the upper arm 45 when the tooth is traveling on the separator plate 32, but the said parts 47, 48 are separated when the tooth is passing around the wheel 30.

The lower portion of each tooth is provided with nonparallel shoulders 49, radial from the centers of the head 39 or the socket 37, but inclined towards each other at such angle that they contact the similar shoulders 49 of the adjacent teeth 34 as they pass around the drive wheel 30.

These shoulders 49 terminate in short parts 50, substantially at right angles to the shoulders 49, each such part 50 alining with the corresponding part of the next tooth and combining therewith to form a base engaging the end of the tooth 31 of the drive wheel 30. Another short part 51 is substantially at right angles to the said part 50. The two parts 50 and 51 of the adjacent saw teeth 34 form a pocket adapted to receive the end of the drive tooth 31 of the gear wheel 30, the said tooth 31 transmitting the driving power to the rearward part 51 of the forward tooth. The part 52, joining the above parts 51, is curved downward therefrom to a tip 53, which is grooved to fit the beveled edges 33 of the separator plate 32 (Fig. 5) on which the teeth ride. The curved edges of the part 52 permit the saw teeth 34 to intermesh with the teeth 31 of the gear wheel 30 as they approach and leave the said gear wheel.

Usually my improved chain saw will be manipulated by two men, one at each end, who will control the saw by means of the handles 6, but in Fig. 1 I have illustrated a tripod 54 supporting the idler end of the saw.

If it is desired to replace one or more of the teeth of the chain saw, the chain is moved until the defective tooth is opposite a hole or opening 54 (Fig. 6) in the plates 7 and 8 of either end frame. Then the teeth on each side thereof are suitably secured and the defective tooth 34 is slipped upward through the opening and the substitute tooth is passed through the hole and its head 39 is slipped into the socket 37 of the forward tooth while its socket 37 is slipped over the head 39 of the rearward tooth. The said teeth may then be released and the saw is again ready for operation. It will be remembered that the two lugs 43 and 47 are out of engagement with their complementary grooves 44 and 48 where the chain is bent around the wheel 30.

It is of course understood that many changes may be made in the details of construction of my improved chain saw without departing from the scope of the appended claim.

Having described my invention what I claim and desire to secure by Letters Patent, is:

In a chain saw provided with a separator plate, having beveled edges, handle frames secured to the ends thereof and each comprising two separated plates, and a toothed wheel revolubly mounted between the plates of each said handle frames, one of said toothed wheels being driven; a chain comprising a single series of similar links, each link having a circular head extending therefrom by a neck and fitting in a complementary socket in the preceding link, and having an inward extension, grooved to ride on the beveled edges of said separator plate and shaped to mesh with the teeth of said wheels, and having wood cutting or raking teeth formed on the outer edges of said links.

EDWARD KUPKA.